United States Patent
Kuo et al.

(10) Patent No.: US 8,009,363 B2
(45) Date of Patent: Aug. 30, 2011

(54) PRISM BEAMSPLITTERS

(75) Inventors: Huei Pei Kuo, Cupertino, CA (US); Michael Renne Ty Tan, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/922,103

(22) PCT Filed: Apr. 2, 2008

(86) PCT No.: PCT/US2008/004361
§ 371 (c)(1),
(2), (4) Date: Sep. 10, 2010

(87) PCT Pub. No.: WO2009/123590
PCT Pub. Date: Oct. 8, 2009

(65) Prior Publication Data
US 2011/0026129 A1    Feb. 3, 2011

(51) Int. Cl.
G02B 27/14  (2006.01)
G02B 27/10  (2006.01)
G02B 5/04   (2006.01)

(52) U.S. Cl. ........ 359/638; 359/636; 359/639; 359/640; 359/641; 359/618; 359/831; 359/833

(58) Field of Classification Search ............ 359/618, 359/630–641, 556, 583, 831, 833, 834, 836, 359/837; 356/130, 134, 135, 141.2, 144, 356/153, 498, 515; 355/50, 51; 353/20
See application file for complete search history.

(56) References Cited

U.S. PATENT DOCUMENTS

| | | | | |
|---|---|---|---|---|
| 3,449,051 A * | 6/1969 | Levitt | | 356/130 |
| 3,836,249 A * | 9/1974 | Weber | | 355/51 |
| 4,439,010 A | 3/1984 | Doty | | |
| 4,571,030 A * | 2/1986 | Fountain | | 359/351 |
| 4,948,229 A * | 8/1990 | Soref | | 385/16 |
| 5,117,239 A * | 5/1992 | Riza | | 342/375 |
| 5,978,125 A * | 11/1999 | Yao | | 359/256 |
| 6,791,760 B2 * | 9/2004 | Janeczko et al. | | 359/630 |
| 2006/0215117 A1 | 9/2006 | Austuen | | |

FOREIGN PATENT DOCUMENTS
JP      05257004       10/1993
WO      WO-01-20387    3/2001

OTHER PUBLICATIONS

Hewlett-Packard Development Company, LP., Application No. PCT/US2008/004361, Filed Apr. 2, 2008, PCT International Search Report mailed Sep. 30, 2008.

* cited by examiner

*Primary Examiner* — Loha Ben (57) ABSTRACT

Embodiments of the present invention are directed to single prism beamsplitters and compound beamsplitters formed from combining one or more of the single prism beamsplitters. In one embodiment, the beamsplitters can be configured to produce one or more split beams of light that can emerge at angles other than 90° to one another. The prisms of the beamsplitter embodiments are configured so that light propagating through prisms encounter one or more intermediate planar surfaces at various angles with respect to the path of the light. A certain number of the intermediate planar surfaces can be angled so that the light transmitted along a particular path undergoes total internal reflection within the prism. A number of other intermediate planar surfaces are angled so that the light transmitted along a particular path does not undergo total internal reflection.

15 Claims, 9 Drawing Sheets

PRISM BEAMSPLITTERS

TECHNICAL FIELD

Embodiments of the present invention are directed to optical devices, and, in particular, to prism beamsplitters.

BACKGROUND

Figure 1A:
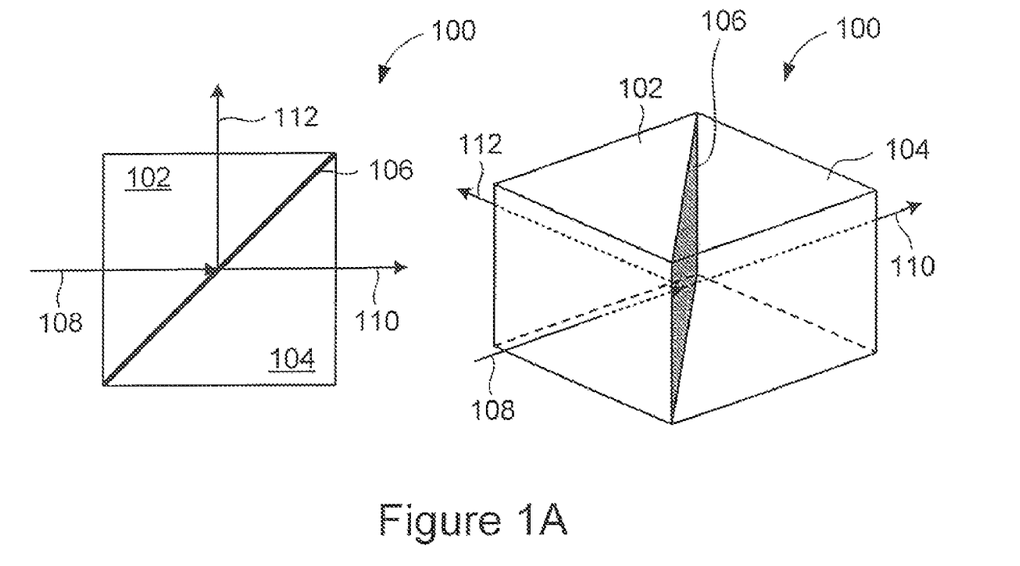
FIG. 1A shows a top and an isometric view of a cube beamsplitter.
Figure 1B:
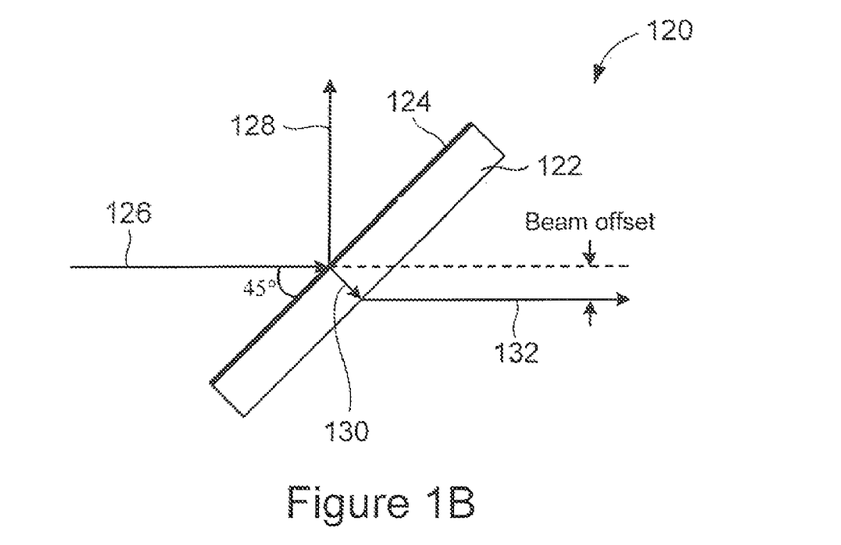
FIG. 1B shows a side view of a plate beamsplitter.

A beamsplitter is an optical device that separates a beam of light into two or more different beams of light. Beamsplitters have a variety of different and useful applications. For example, beamsplitters can be used in cameras and projectors and can be used in interferometry just to name a few. FIGS. 1A-1B show schematic representations of two types of commonly used beamsplitters. FIG. 1A shows a top and an isometric view of a cube beamsplitter 100. The cube beamsplitter 100 includes a first triangular prism 102 and a second triangular prism 104. The hypotenuse surfaces of the prisms 102 and 104 are made parallel and planar and are coated with a layer of partially reflective material 106, such as silver or aluminum. The planar surfaces can be held together with an adhesive having substantially the same refractive index as the prisms 102 and 104. The thickness of the layer 106 can be adjusted to allow desired fractions of light to be transmitted and reflected. As shown in FIG. 1, an incident beam of light 108 enters the cube beamsplitter 100 substantially perpendicular to a planar surface. The layer 106 splits the incident beam 108 into a transmitted beam 110 that emerges from the cube beamsplitter 100 in the same direction as the incident beam 108 and a reflected beam 112 that emerges from the cube beamsplitter 100 substantially perpendicular to the incident beam 108. FIG. 1B shows a side view of a plate beamsplitter 120. The plate beamsplitter 120 includes a single plate 122 of glass with one surface of the plate 122 coated with a layer of partially reflective material 124. As shown in FIG. 1B, the plate 122 is oriented at 45° to an incident beam of light 126. The layer 124 reflects a first portion of the incident beam 126 to produce a reflected beam 128 that is substantially perpendicular to the incident beam 126. A second portion of the incident beam 126 enters the plate 126, which produces a refracted beam 130 that is refracted again upon emerging from the plate 122 to give a transmitted beam 132 that is substantially parallel to the incident beam 126. Due to refraction of the beam entering the plate 120, the path of the transmitted beam 132 is shifted below the path of the incident beam 126, which is called the "beam offset." The magnitude of the beam offset is proportional to the thickness of the plate 122.

Although the beamsplitters 100 and 120 have been employed successfully in a number of different devices, these two commonly used beamsplitters 100 and 120 have a number of disadvantages. For example, the reflected and transmitted light emerging from the beamsplitters 100 and 120 are at right angles, which often necessitates external mirrors to redirect the light. Accordingly, beamsplitters that can be configured to produce reflected and transmitted light at various angles are desired.

DETAILED DESCRIPTION

Embodiments of the present invention are directed to single prism beamsplitters and compound beamsplitters formed from combining one or more of the single prism beamsplitters. The beamsplitters can be configured to produce one or more split beams of light that emerge from the prism at angles other than 90° to one another. The prisms are configured so that light propagating through prisms encounter one or more intermediate planar surfaces at various angles with respect to the path of the light. A certain number of the intermediate planar surfaces can be angled so that the light transmitted along a particular path undergoes total internal reflection ("TIR") at these intermediate planar surfaces. A number of other intermediate planar surfaces are angled so that the light transmitted along a particular path does not undergo TIR. As a result, one or more beams of light propagating through the prism can be selectively split off to emerge from the prism by selectively disposing fully reflective and partial mirrors on the intermediate planar surfaces where TIR does not take place.

Total Internal Reflection

Figure 2:
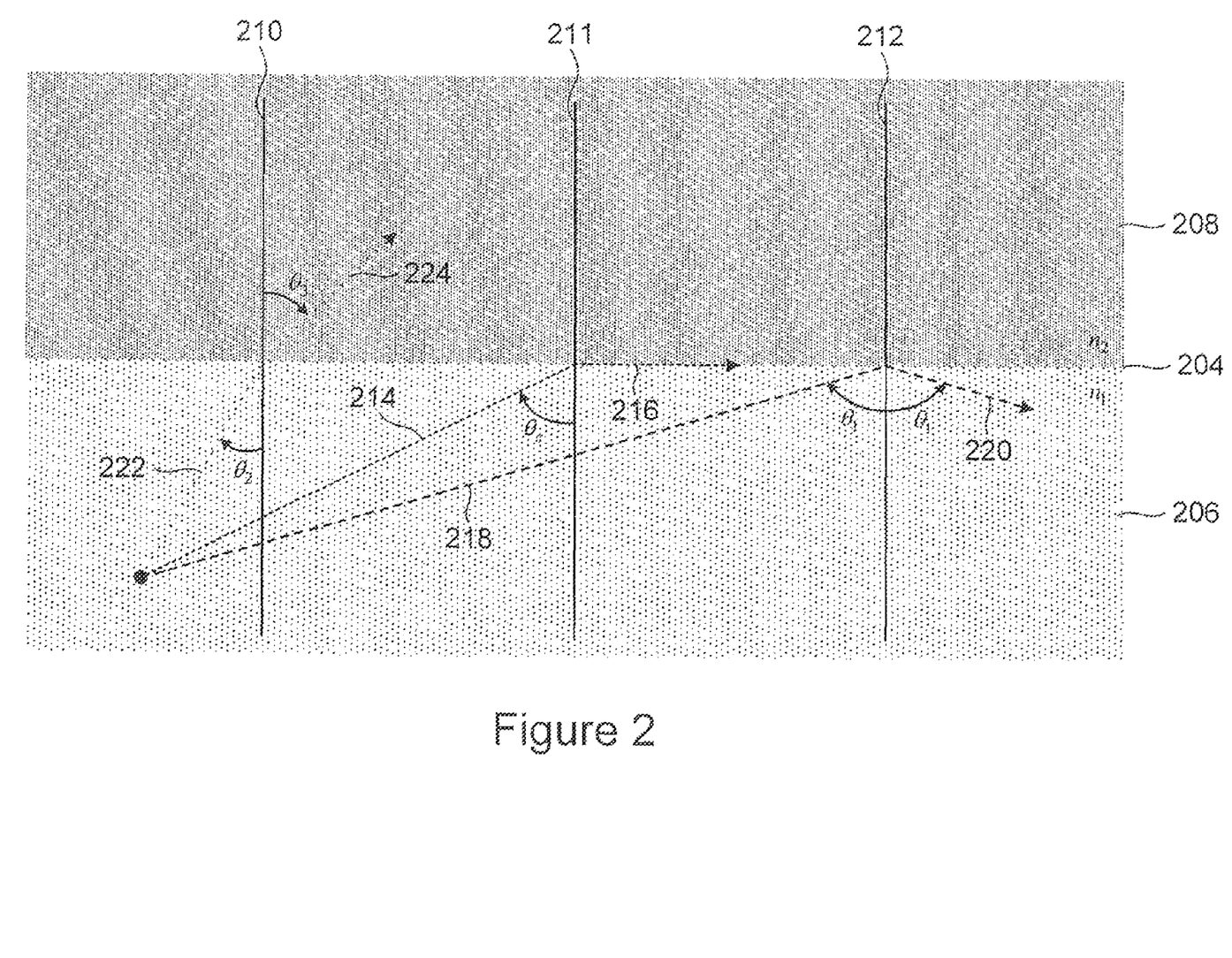
FIG. 2 shows optical properties of an interface between two different materials, each of which has a different index of refraction.

FIG. 2 shows optical properties of an interface between two different materials, each of which has a different index of refraction. A point source 202 emits light in all directions. Rays, identified by directional arrows, are used to represent the direction of light or beams of light propagation through space or an optical system. Each ray has an associated angle-of-incidence with an interface 204 between a first material 206 and a second material 208. The angle-of-incidence is the angle between a ray and an imaginary line called a "normal," which is a perpendicular line to the interface 204 and intersects the interface 204 at the point where the ray is incident on the interface 204. Perpendicular lines 210-212 represent normals that are associated with three rays emanated from the source 202. The first material 206 is assumed to have a larger refractive index $n_1$ than the refractive index $n_2$ of the second material 208. For example, the first material 206 can be composed of glass or acrylic, the second material 208 can be air, and the interface 204 can represent the planar surface of a prism, such as the prisms described below. A ray 214 with a particular angle-of-incidence $\theta_c$ results in a refracted ray 216 directed along the surface of the first material 206. The angle $\theta_c$ is called the "critical angle." Rays with an angle-of-incidence greater than the critical angle $\theta_c$ undergo TIR. Rays with an angle-of-incidence that are less than the critical angle $\theta_c$ are refracted and pass from the first material 206 into the second material 208 with an angle-of-refraction that is greater than the angle-of-incidence. For example, a ray 218 has an angle-of-incidence $\theta_1$ that is greater than the critical angle $\theta_1$ resulting in a reflected ray 220 reflecting off of the interface 204 with the same angle $\theta_1$, in accordance with the Law of Reflection. On the other hand, a ray 222 has an angle-of-incidence $\theta_2$ that is less than the critical angle $\theta$, resulting in a refracted ray 224 emerging from the first material 210 with an angle-of-refraction $\theta_3$, where $\theta_3 > \theta_2$ in accordance with the Law of Refraction.

EMBODIMENTS OF THE PRESENT INVENTION

Figure 3A:
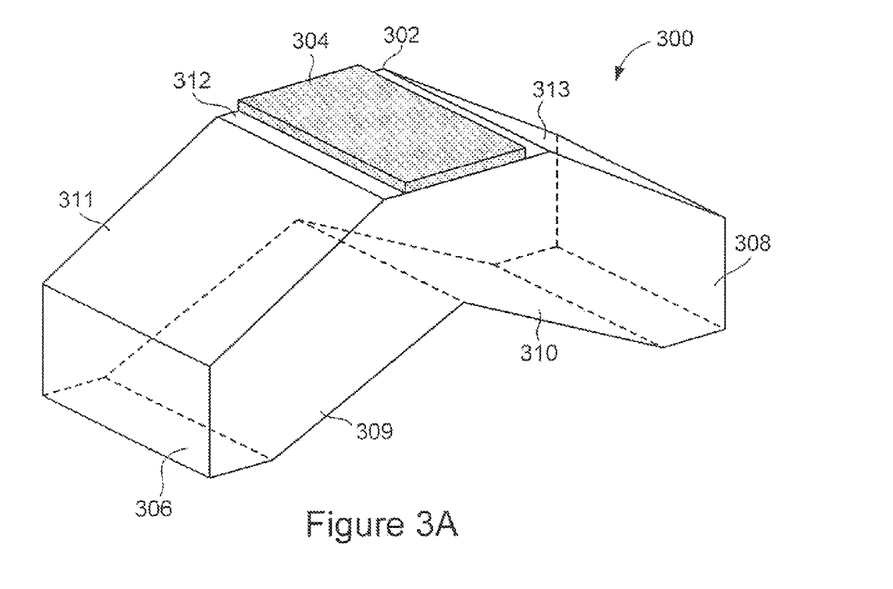
FIG. 3A shows an isometric view of a first beamsplitter configured in accordance with embodiments of the present invention.
Figure 3B:
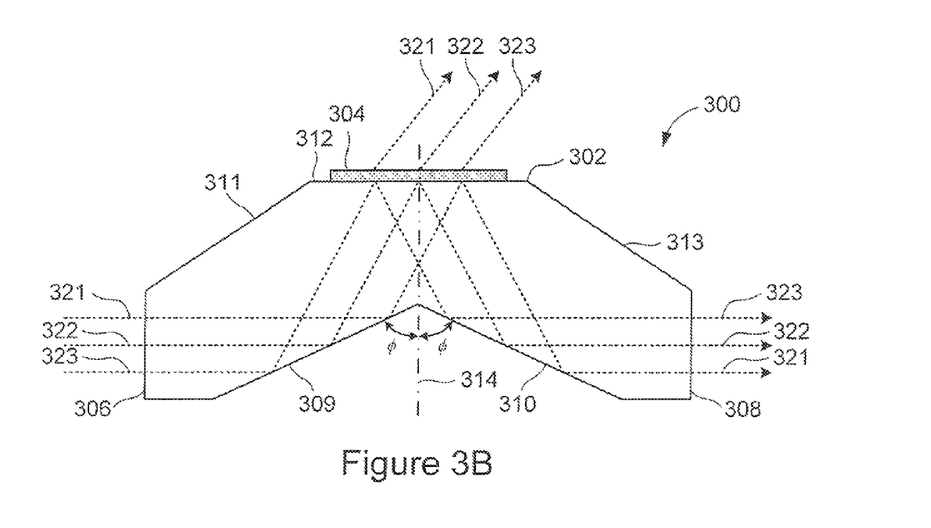
FIG. 3B shows a side-view of the first beamsplitter, shown in FIG. 3A, configured in accordance with embodiments of the present invention.

FIG. 3A shows an isometric view of a first beamsplitter 300 configured in accordance with embodiments of the present invention. The beamsplitter 300 includes a prism 302 and a partial mirror 304. The prism 302 is configured with a first planar surface 306, a second planar surface 308, and intermediate planar surfaces 309-313. The partial mirror 304 is disposed on at least a portion of the planar surface 312. FIG. 3B shows a side-view of the beamsplitter 300 configured in accordance with embodiments of the present invention. Dashed-line 314 represents a side-view of a plane-of-symmetry positioned perpendicular to the planar surface 312 and bisecting the prism 302. The first and second planar surface 306 and 308 can be ideally parallel to the plane 314, the planar surfaces 309 and 310 can also be ideally configured with the same angle $\theta$ to the plane 314.

As shown in FIG. 3B, three different rays 321-323 trace a path of portions of a beam of light entering the prism 302 substantially perpendicular to the first planar surface 406. The planar surface 309 is angled so that the rays 321-323 undergo TIR at the planar surface 309 and are reflected toward the planar surface 312 with an angle-of-incidence that is less than the critical angle associated with the planar surface 312. The rays 321-323 are split at the partial mirror 304 indicating that the partial mirror 304 allows a first portion of the light to emerge from the prism 402 and reflects a second portion of the light to the planar surface 310, which is angled so that the rays 321-323 undergo TIR and emerge from the prism 302 substantially perpendicular to the second planar surface 308. Note that the rays 321-323 associated with the second portion of the light emerges from the prism 302 with substantially no beam offset, and in this particular case, the light is inverted with respect to the incident orientation of the light entering the prism.

Figure 3C:
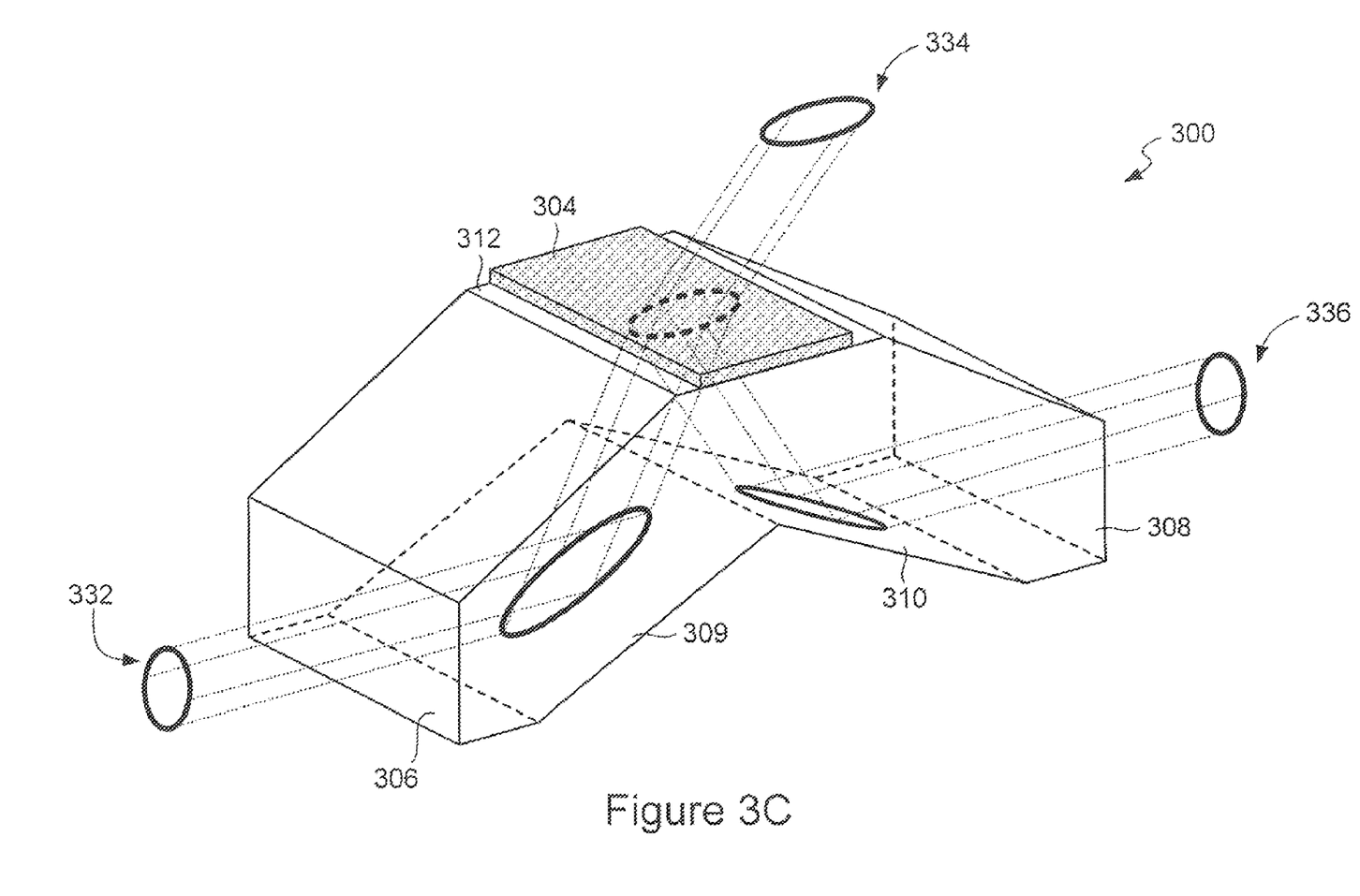
FIG. 3C shows an isometric view of the first beamsplitter, shown in FIG. 3A, splitting an incident beam into two exit beams in accordance with embodiments of the present invention.

FIG. 3C shows an isometric view of splitting an incident beam 332 using the beamsplitter 300 in accordance with embodiments of the present invention. The beam enters the prism 302 through the first planar surface 306 and is reflected by the planar surface 309 toward the planar surface 312. The partial mirror 304 splits the beam into a first portion that emerges 334 from the prism 302 and a second portion that is internally reflected toward the planar surface 310. The second portion of the beam is reflected by the planar surface 310 and emerges 336 from the prism 302 through the second planar surface 308. The internal reflections at the planar surfaces 309 and 310 are due to TIR, and the internal reflection of the second portion of the image at the planar surface 312 is due to the partial mirror 304.

Figure 4A:
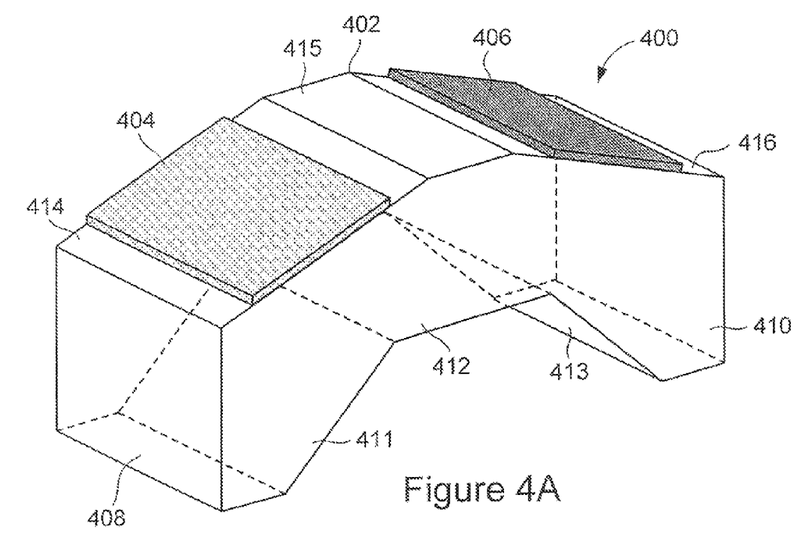
FIG. 4A shows an isometric view of a second beamsplitter configured in accordance with embodiments of the present invention.
Figure 4B:
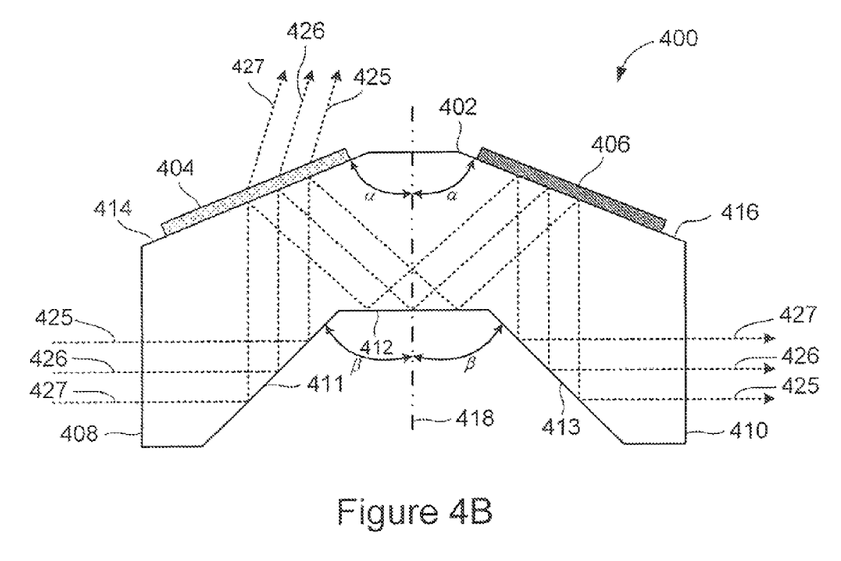
FIG. 4B shows a side-view of the second beamsplitter, shown in FIG. 4A, configured in accordance with embodiments of the present invention.

FIG. 4A shows an isometric view of a second beamsplitter 400 configured in accordance with embodiments of the present invention. The beamsplitter 400 includes a prism 402, a partial mirror 404, and a fully reflective mirror 406. The prism 402 is configured with a first planar surface 408, a second planar surface 410, and intermediate planar surfaces 411-416. The partial mirror 404 is disposed on at least a portion of the planar surface 414, and the mirror 406 is disposed on at least a portion of the planar surface 416. FIG. 4B shows a side-view of the second beamsplitter 400 configured in accordance with embodiments of the present invention. Dashed-line 418 represents a side-view of a plane-of-symmetry positioned perpendicular to the planar surface 412 and bisecting the prism 402. The first and second planar surface 408 and 410 are ideally parallel to the plane 418, the planar surfaces 411 and 413 are also ideally configured with the same angle $\beta$ to the plane 418, and the planar surfaces 414 and 416 are ideally configured with the same angle $\alpha$ to the plane 418.

As shown in FIG. 4B, three different rays 425-427 trace paths of portions of a beam of light entering the prism 402 substantially perpendicular to the first planar surface 408. The planar surface 411 is angled so that the rays 425-427 entering the prism 402 undergo TIR and are reflected toward the planar surface 414 with an angle-of-incidence that is less than the critical angle associated with the planar surface 414. The rays 425-427 are split at the partial mirror 404 to allow a first portion of the light to emerge from the prism 402 and reflects a second portion of the light to the planar surface 412, which is angled so that the second portion of the light undergoes TIR and is reflected to the planar surface 416 with an angle-of-incidence that is less than the critical angle associated with the planar surface 416. The rays 425-427 are reflected by the mirror 406 to the planar surface 413 which is angled so that the rays 425-427 emerge from the prism 402 substantially perpendicular to the second planar surface 410. Note that the rays 425-427 associated with the second portion of the light emerge from the prism 402 with substantially no beam offset.

Figure 4C:
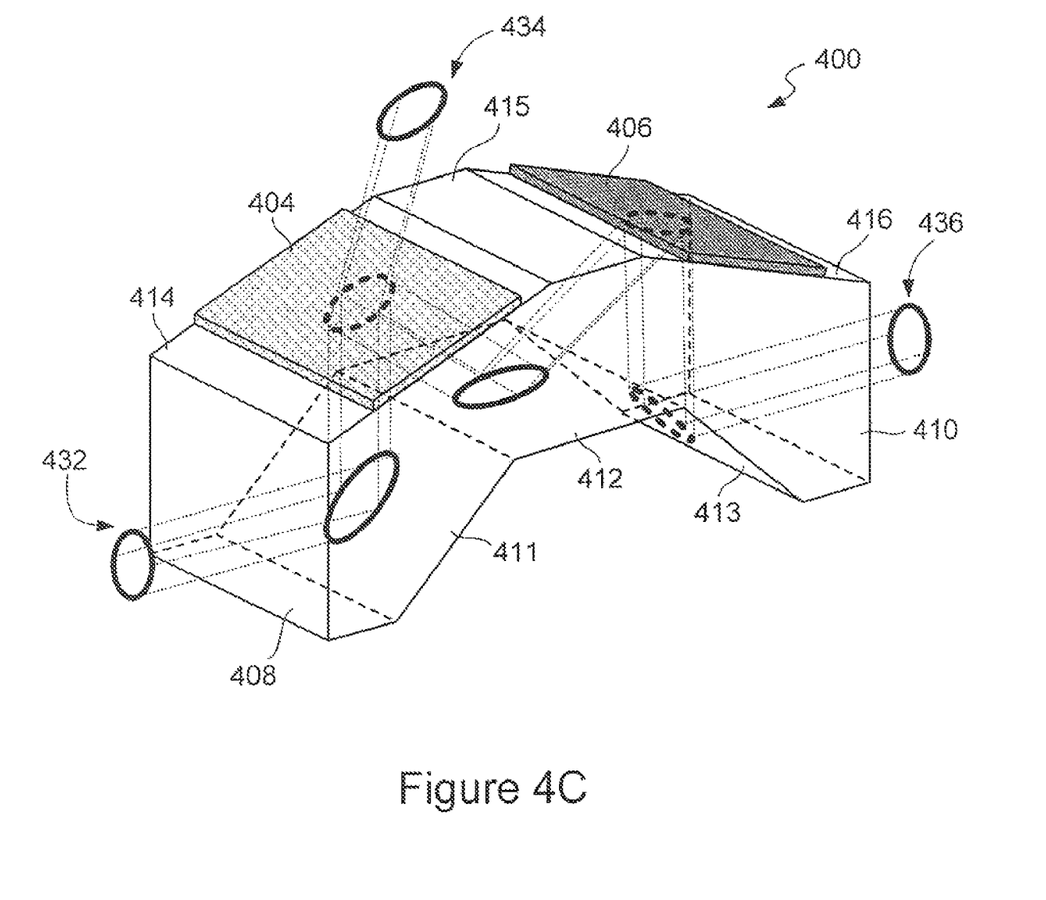
FIG. 4C shows an isometric view of the second beamsplitter, shown in FIG. 6A, splitting an incident beam into two exit beams in accordance with embodiments of the present invention.

FIG. 4C shows an isometric view of splitting an incident beam using the beamsplitter 400 in accordance with embodiments of the present invention. The beam 432 enters the prism 402 through the first planar surface 408 and is reflected by the planar surface 411 toward the planar surface 414. The partial mirror 404 splits the beam into a first portion that emerges 434 from the prism 402 and a second portion that is reflected toward the planar surface 412. The second portion is reflected off of the planar surface 412, the mirror 406, and the planar surface 413 before emerging 436 from the prism 402. The internal reflections at the planar surfaces 411-413 are due to TIR, and the internal reflection at the planar surface 416 is due to the mirror 406.

Figures 5, 6:
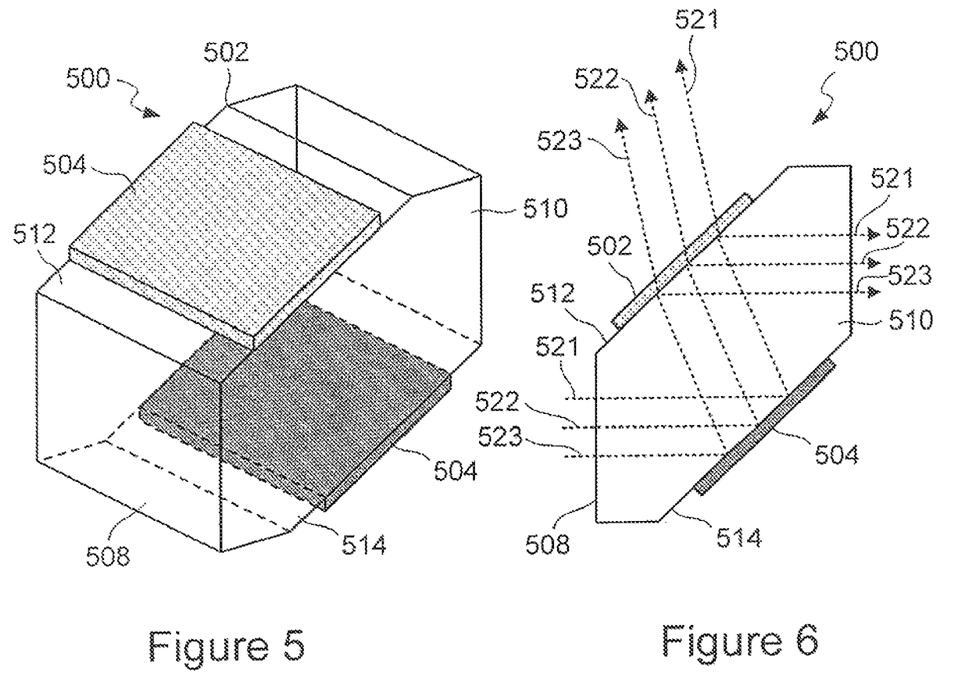
FIG. 5 shows an isometric view of a third beamsplitter configured in accordance with embodiments of the present invention.
FIG. 6 shows a side-view of the third beamsplitter, shown in FIG. 5, configured in accordance with embodiments of the present invention.

The prisms of the beamsplitters 300 and 400 are configured to produce an odd number of internal reflections. The family of beamsplitters also includes beamsplitters with an even number of internal reflections. FIG. 5 shows an isometric view of a third beamsplitter 500 configured in accordance with embodiments of the present invention. The beamsplitter 500 includes a prism 502, a partial mirror 504, and fully reflective mirror 506. The prism 502 is configured with a first planar surface 508, a second planar surface 510, and intermediate planar surfaces 512 and 514. The partial mirror 504 is disposed on at least a portion of the planar surface 512.

FIG. 6 shows a side-view of the beamsplitter 500 configured in accordance with embodiments of the present invention. Three different rays 521-523 trace paths of portions of a beam of light entering the prism 502 substantially perpendicular to the first planar surface 508. In this particular embodiment, the planar surface 514 is angled so that the rays 521-523 do not undergo TIR at the planar surface 514 and are reflected by the mirror 504 toward the planar surface 512 with an angle-of-incidence that is less than the critical angle associated with the planar surface 512. The rays 521-523 are split at the partial mirror 504 to allow a first portion of the light to emerge from the prism 502 and reflect a second portion of the light that emerges from the prism 502. Note that the rays 521-523 associated with the second portion of the light emerges from the prism 502 not inverted with respect to the incident orientation of the light entering the prism 502.

Figure 7:
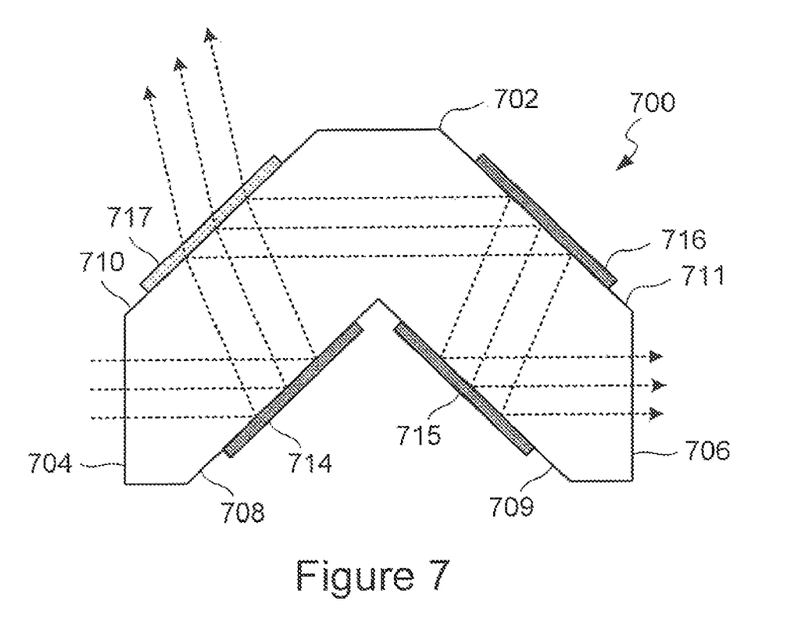
FIG. 7 shows a side-view of a fourth beamsplitter configured in accordance with embodiments of the present invention.

FIG. 7 shows a side-view of a fourth beamsplitter 700 configured in accordance with embodiments of the present invention. The beamsplitter 700 includes a prism 702 configured with a first planar surface 704, a second planar surface 706, and four intermediate planar surfaces 708-711. The beamsplitter 700 also includes three fully reflective mirrors 714-716 disposed on portions of the planar surfaces 708, 709, and 711 and one partial mirror 717 disposed on at least a portion of the planar surface 710. As shown in FIG. 7, the partial mirror 717 splits the light reflected at the planar surface 708 into a first portion that emerges from the prism and a second portion that is reflected at mirrors 716 and 715 and emerges from the prism 702. In other embodiments, the intermediate planar surfaces 708 and 709 can angled so that light entering the prism 702 undergo TIR at the intermediate planar surfaces 708 and 709. As a result, the mirrors 714 and 715 may be optional. In other embodiments, one or more of the fully reflective mirrors 714-716 can be replaced with a partial mirror so that more than one beam of light can be split off to emerge from the prism.

Figure 8:
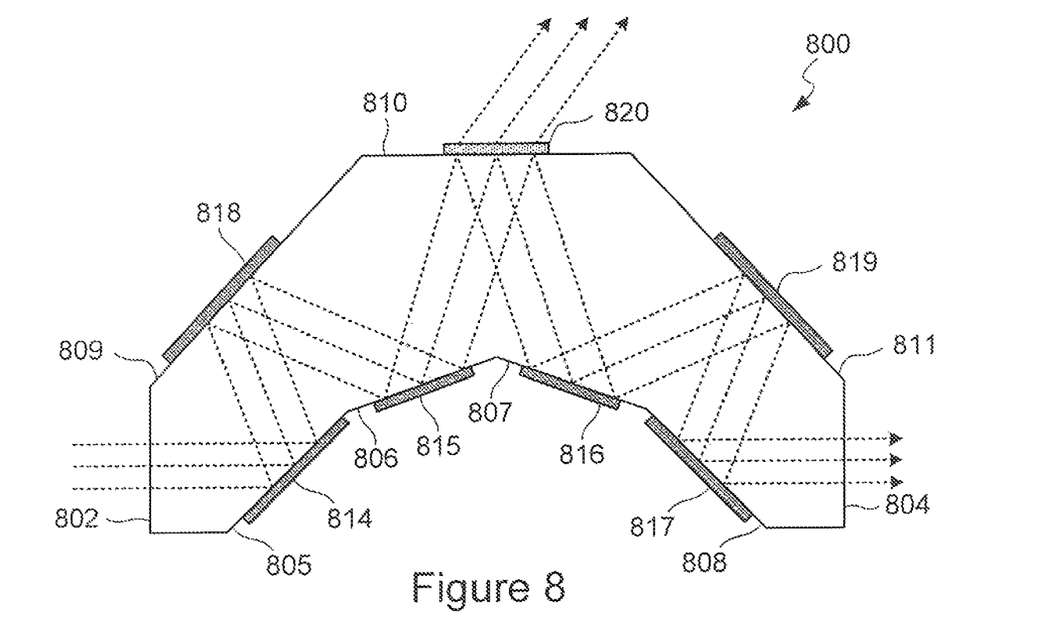
FIG. 8 shows a side-view of third beamsplitter configured in accordance with embodiments of the present invention.

FIG. 8 shows a side-view of third beamsplitter 800 configured in accordance with embodiments of the present invention. The beamsplitter 800 includes a prism configured with a first planar surface 802, a second planar surface 804, and eight intermediate planar surfaces 805-811. The beamsplitter 800 also includes six fully reflective mirrors 814-819 disposed on portions of the planar surfaces 805-809 and 811 and one partial mirror 820 disposed on at least a portion of the planar surface 810. As shown in FIG. 8, the partial mirror 820 splits the light reflected at the planar surface 806 into a first portion that emerges from the prism and a second portion that is reflected by the mirrors 816-819 and emerges from the prism 800. A number of the mirrors 814-819 may be optional depending on which of the planar surfaces are angled to cause TIR of light transmitted through the prism. In other embodiments, one or more of the fully reflective mirrors can be replaced with a partial mirror so that more than one beam of light can be split off to emerge from the prism. In other embodiments, rather than disposing the partial mirror 820 on the planar surface 810, the partial mirror 820 can be disposed on one of the other planar surfaces 809 and 811 and fully reflective mirrors on the remaining planar surfaces.

Figure 9:
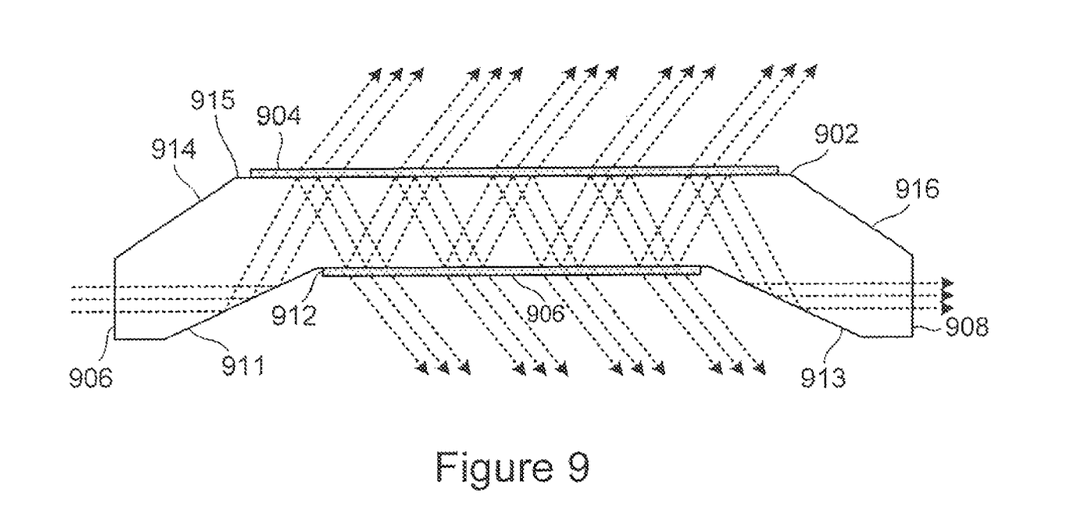
FIG. 9 shows a side view of a fourth beamsplitter configured in accordance with embodiments of the present invention.

FIG. 9 shows a side view of a fourth beamsplitter 900 configured in accordance with embodiments of the present invention. The beamsplitter 900 includes a prism 902 and a first partial mirror 904 and second partial mirror 906. The prism 902 is configured with a first planar surface 908, a second planar surface 910, and intermediate planar surfaces 911-916. The partial mirror 904 is disposed on at least a portion of the planar surface 915, and the partial mirror 906 is disposed on at least a portion of the planar surface 912. The prism 902 is ideally configured with mirror symmetry, as described above with reference to FIGS. 4 and 6. As shown in FIG. 9, the planar surface 912 and 915 are extended so that a beam of light transmitted through the prism 902 has nine internal reflections, each with an angle of incidence that is less than the critical angle associated with the planar surfaces 912 and 915. As a result, beamsplitter 900 splits a single beam of light into ten separate beams of light.

Note that the beamsplitter embodiments described above may also include a light guide through which light is transmitted into the prisms as a nearly collimated beam. In certain embodiments, the light guide can be a hollow metal cylinder.

Figure 10A:
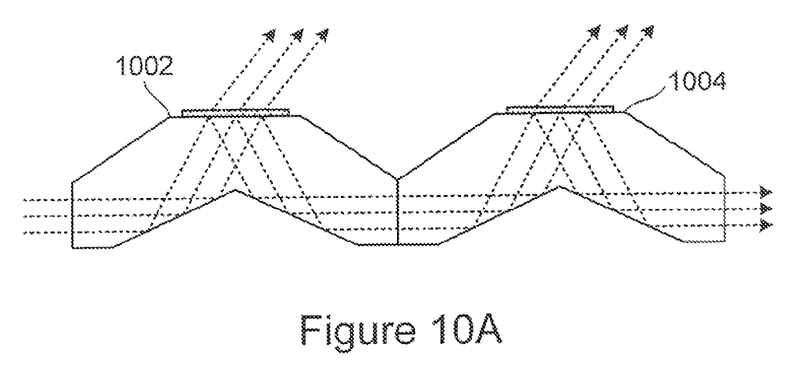
FIGS. 10A-10C show three exemplary compound beamsplitters configured in accordance with embodiments of the present invention.
Figure 10B:
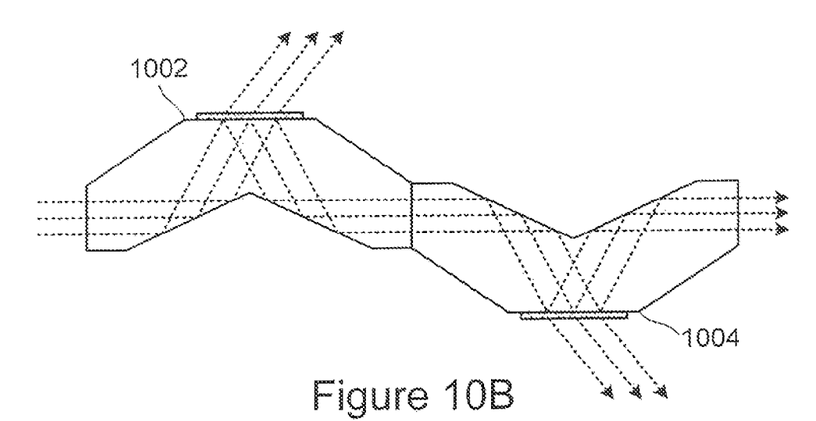
Figure 10C:
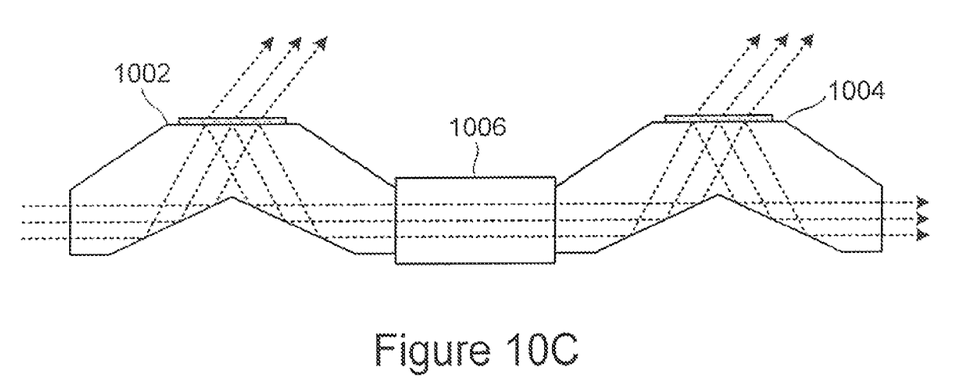

In other embodiments of the present invention, two or more of the single prism beamsplitters 400 and 600 can be combined to form compound beamsplitters that split a single beam of light into three or more different beams of light. For example, FIGS. 10A-10C show three exemplary compound beamsplitters configured in accordance with embodiments of the present invention. The beamsplitters are formed from a first single prism beamsplitters 1002 and a second single prism beamsplitter 1004 that are combined to split a single beam of light into three different beams of light. The first and second beamsplitters 1002 and 1004 are configured in accordance with the beamsplitter 400. In FIG. 10A, the first and second beamsplitter 1002 and 1004 have the same orientation so that two split off beams have the same direction. In FIG. 10B, the first and second beamsplitter 1002 and 1004 have opposite orientations so that two split off beams have different directions. In FIG. 10C, the first and second beamsplitters 1002 and 1004 have the same orientation, but a light guide 1006, such as a hollow metal cylinder, is used to separate the two beamsplitters.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A beamsplitter comprising:
a prism having a first planar surface, a second planar surface, and a plurality of intermediate planar surfaces, wherein the first and second planar surfaces are substantially parallel, and one or more of the intermediate planar surfaces are angled so that a beam of light to propagate through the prism does not undergo total internal reflection at the one or more intermediate planar surfaces where the beam of light is to emerge from the prism through the one or more intermediate planar surfaces; and one or more partial mirrors disposed on at least a portion of the one or more intermediate planar surfaces so that the beam of light to propagate through the prism is split into a refracted beam of light to emerge from the prism through the one or more partial mirrors and a reflected beam of light that to be reflected back into the prism.

2. The beamsplitter of claim 1, wherein the intermediate planar surfaces are angled and positioned so that the path of the beam of light to emerge from the prism through the second planar surface is approximately parallel to and approximately aligned with the path of the beam of light to enter the prism through the first planar surface.

3. The beamsplitter of claim 1, wherein the plurality of intermediate planar surfaces further comprise a number of the intermediate planar surfaces angled so that the beam of light to be transmitted through the prism undergoes total internal reflection.

4. The beamsplitter of claim 1, further comprising mirrors disposed on a number of the intermediate planar surfaces so that the beam of light is to be reflected back into the prism.

5. The beamsplitter of claim 1, wherein the prism further comprises glass or acrylic.

6. The beamsplitter of claim 1, wherein the prism further comprises a number of the intermediate planar surfaces angled so that the beam of light to propagate through the prism undergoes an odd number of internal reflections.

7. The beamsplitter of claim 1, wherein the prism further comprises a number of intermediate planar surfaces angled so that the beam of light to propagate through the prism undergoes an even number of internal reflections.

8. The beamsplitter of claim 1, further comprising a light guide to transmit light into the prism in a nearly collimated beam.

9. The beamsplitter of claim , wherein the light guide is a hollow metal cylinder.

10. A compound beamsplitter comprising a number of beamsplitters; wherein each beamsplitter is configured in accordance with the beamsplitter of claim 1 and a number of beam splitters are arranged so that each beamsplitter reflects a portion of a beam of light to enter the compound beamsplitter and to transmit a portion of the beam light.

11. The compound beamsplitter of claim 10, wherein the adjacent beamsplitters are each configured with a first planar surface and a second planar surface and are arranged so that the first planar surface of a first beamsplitter abuts the second planar surface of a second beamsplitter.

12. The compound beamsplitter of claim 10, wherein a path of the beam of light to enter the compound beamsplitter is approximately parallel to and approximately aligned with the path of a portion of the beam of light to be transmitted through the compound beamsplitter.

13. The compound beamsplitter of claim 10, further comprising a light guide to transmit light into the prism in a nearly collimated beam.

14. The compound beamsplitter of claim 13, wherein the light guide is a hollow metal cylinder.

15. The compound beamsplitter of claim 10, further comprising one or more light guides positioned to separate two or more of the beamsplitters.

* * * * *

UNITED STATES PATENT AND TRADEMARK OFFICE
CERTIFICATE OF CORRECTION

PATENT NO. : 8,009,363 B2  
APPLICATION NO. : 12/922103  
DATED : August 30, 2011  
INVENTOR(S) : Huei Pei Kuo et al.

Page 1 of 1

It is certified that error appears in the above-identified patent and that said Letters Patent is hereby corrected as shown below:

In column 7, line 32, in Claim 7, delete "of intermediate" and insert -- of the intermediate --, therefor.

In column 8, line 6, in Claim 9, delete "claim ," and insert -- claim 8, --, therefor.

In column 8, line 9, in Claim 10, delete "beamsplitters;" and insert -- beamsplitters, --, therefor.

Signed and Sealed this
Tenth Day of April, 2012

David J. Kappos
*Director of the United States Patent and Trademark Office*